United States Patent

Nagashima

Patent Number: 5,501,165
Date of Patent: Mar. 26, 1996

[54] METHOD FOR FORMING DECORATIVE CREASES IN A TRIM COVER ASSEMBLY

[75] Inventor: Hideo Nagashima, Akishima, Japan

[73] Assignee: Tachi-s Co., Ltd., Japan

[21] Appl. No.: 209,784

[22] Filed: Mar. 11, 1994

[51] Int. Cl.$^6$ .......................... D05B 15/00; D05B 35/08; A47C 7/24

[52] U.S. Cl. ................ 112/475.06; 112/470.27; 112/132; 297/218.1

[58] Field of Search .................. 112/2.1, 266.1, 112/132, 131, 439, 121.23, 262.1, 134, 470.27, 475.06; 297/218, 219.1, 228.1, 452.13, 452.25, 452.32, 452.61

[56] References Cited

U.S. PATENT DOCUMENTS

| | | | |
|---|---|---|---|
| 1,793,139 | 2/1931 | Stack | 112/121.23 |
| 1,919,459 | 7/1933 | Boyd | 112/121.23 X |
| 2,935,958 | 5/1960 | Kuhn | 112/132 |
| 2,988,027 | 6/1961 | Guerard | 112/134 |
| 4,606,580 | 8/1986 | Yoshizawa | 297/458 |
| 4,663,211 | 5/1987 | Kon | 297/452.61 X |
| 4,754,720 | 7/1988 | Dietrich et al. | 112/132 X |
| 4,784,437 | 11/1988 | Shimada | 297/452 |
| 5,002,335 | 3/1991 | Bengtsson | 297/218 X |
| 5,016,941 | 5/1991 | Yokota | 297/218 X |
| 5,236,243 | 8/1993 | Reyes | 297/218 |

FOREIGN PATENT DOCUMENTS

| | | |
|---|---|---|
| 58-118718 | 7/1983 | Japan . |
| 60-215390 | 10/1985 | Japan . |
| 61-158445 | 7/1986 | Japan . |

Primary Examiner—C. D. Crowder
Assistant Examiner—Ismael Izaguirre
Attorney, Agent, or Firm—Oldham & Oldham Co.

[57] ABSTRACT

A method for forming decorative creases in a trim cover assembly for an automotive seat, which basically involves using one unitary sheet of base trim cover assembly and effecting a gather sewing to such base trim cover assembly so that at least one decorative crease is formed therein in a fashion developing symmetrically relative to the sewing direction. The resulting decorative crease may be deepened for more aesthetic effect by pinching and sewing a part of reverse side of the trim cover assembly corresponding to the crease, along the sewing direction. Also, an automotive seat with the trim cover assembly made by such method.

19 Claims, 5 Drawing Sheets

METHOD FOR FORMING DECORATIVE CREASES IN A TRIM COVER ASSEMBLY

BACKGROUND OF INVENTION

1. Field of the Invention

The present invention relates to a method for forming decorative creases or wrinkles in a trim cover assembly for an automotive seat, and an automotive seat with the trim cover assembly having those decorative creases or wrinkles formed therein.

2. Description of Prior Art

Figure 1:
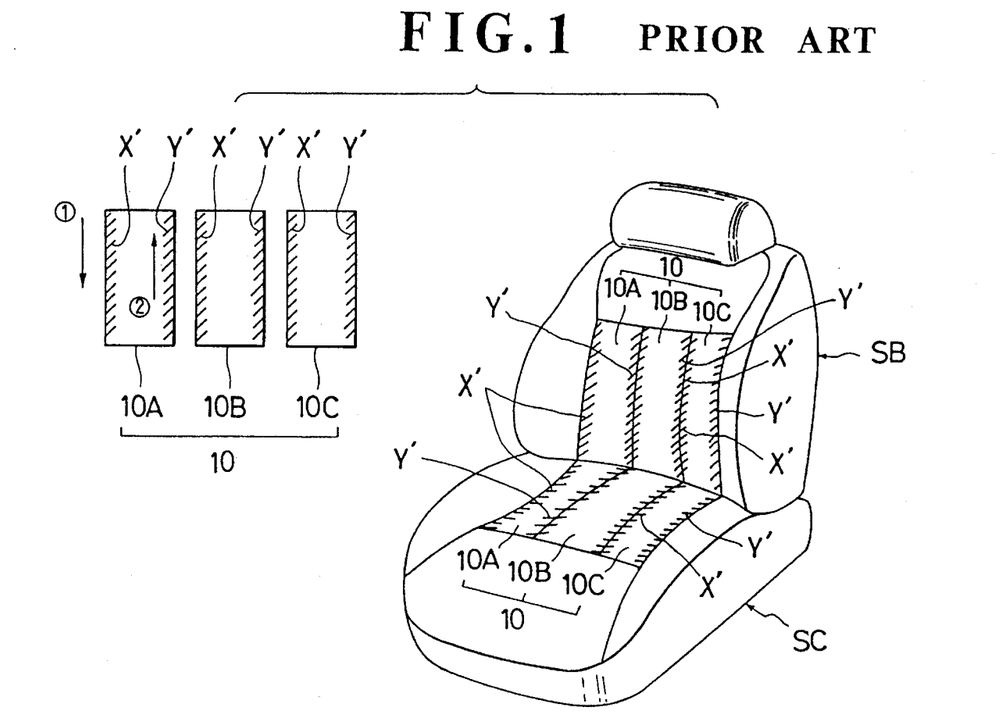
FIG. 1 is a schematic perspective view showing an automotive seat and a conventional trim cover assembly applied thereto.

There has been known an automotive seat on which is affixed such upholstery as a foam cushion member and a trim cover assembly covering the foam cushion member, with some decorative creases formed in the trim cover assembly, for improving the aesthetic appearance of the seat. FIG. 1 shows a conventional automotive seat which comprises a seat back (SB) and a seat cushion (SC), each being covered with a trim cover assembly, needless to mention, and the central seating cover sections (10)(10) of the respective trim cover assemblies of the seat back (SB) and seat cushion (SC) are shown to be formed with some plural rows of decorative creases (X')(Y') therein.

In this illustration, regardless of both seat back (SB) and seat cushion (SC), the trim cover assembly central cover section (10) is formed by sewing together three separate strips of covering members (10A)(10B)(10C). But, before forming such central cover section (10), the three separate covering members (10A)(10B)(10C) are each gathered and sewn at its both lateral sides by means of a sewing machine designed therefor, as can be seen from FIG. 1, so as to create plural decorative creases (X')(Y') in both sides of each covering member.

Figure 3:
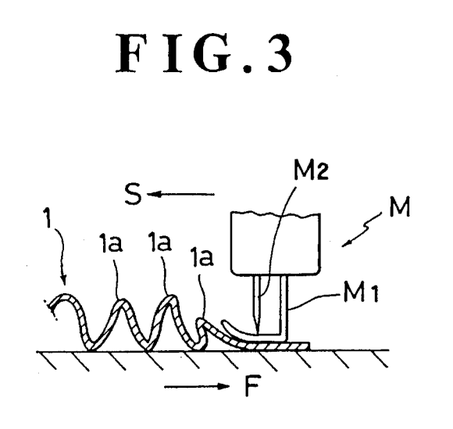
FIG. 3 is a schematic diagram showing a gather sewing of the base trim cover assembly by use of a known gather sewing machine in accordance with the present invention.

That gathering sewing operation itself is known, by use of a particular conventional sewing machine (M) shown in FIG. 3, which will therefore not be explained in details.

Briefly stated, however, in the conventional state of art, as indicated by the arrow 1 in FIG. 1, one lateral end portion of each covering member (10A, 10B or 10C) is firstly gathered and sewn by the sewing machine (M) in one direction (i.e. in the downward direction as viewed from FIG. 1), and then, as understandable from FIG. 3, the gathered parts (1a, 1a, . . . ) of the covering member (10A, 10B or 10C) are pressed and folded one after another on the surface thereof by means of the retainer member (M1) of sewing machine (M), and sewn in the sewing direction (S), to thereby effect sewing in a gathered fashion.

It is noted here that in FIG. 3, the arrow (S) stands for a sewing direction of the machine (M) corresponding to that of the arrows ① and ② in FIG. 1, and the arrow (F) stands for a feeding direction of the same machine (M) for feeding the covering member.

Figure 2:
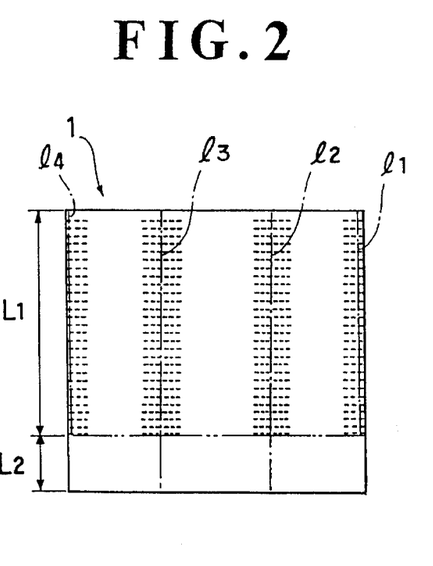
FIG. 2 is a plan view of one unitary sheet of base trim cover assembly in accordance with the present invention.

As the gathered parts (1a) are folded and sewn adjacent to and along the lateral end of covering member (10A, 10B or 10C), the resultant creases (X') tend to develop themselves outwards in a generally rearwardly slant fashion in reference to a seam line along the sewing direction ①. After completing this first sewing, another lateral end portion of the covering member (10A, 10B or 10C) is subject to the same gathering sewing in another direction ② (i.e. in the upward direction as viewed from FIG. 1) opposite to that of the foregoing first sewing operation. As a result, such second sewing produces the creases (Y') which are developed in a generally rearwardly slant fashion in reference to that another sewing direction ②. Thus, an apparent difference arises in the slant developing direction between those two decorative creases (X')(Y') as seen in FIG. 2, due to the different sewing directions ① and ② above.

With the same sewing steps described above, each of other remaining two covering members (10B)(10C) are formed with the similar two mutually oppositely oriented decorative creases (X')(Y').

Finally, all the three covering members (10A)(10B)(10C) are sewn together at their corresponding both lateral ends to provide a one unit of central seating cover section (10), which is further affixed by means of anchoring member (not shown) upon the corresponding area of cushion member (not shown), as in FIG. 1.

However, the resultant central seating cover section (10), which forms a part of trim cover assembly for the seat shown in FIG. 1, represents all of the decorative creases (X')(Y') to be slant in the same direction, per each of vertical rows of creases which are defined at the sewn jointed portions among the three covering members (10A)(10B)(10C) where the adjoining lateral ends of those covering members with the creases (X')(Y') are sewn and jointed with one another. This has been found very objectionable for the decorative creases, and impaired the aesthetic appearance of the trim cover assembly affixed over the seat.

SUMMARY OF THE INVENTION

In view of the above-stated drawbacks, it is a primary purpose of the present invention to provide a method for forming a decorative crease in a trim cover assembly for an automotive seat, which improves the aesthetic appearance of both decorative crease and trim cover assembly.

In order to achieve such purpose, in accordance with the present invention, there is provided the basic steps of:
providing one unitary sheet of base trim cover assembly; and
effecting a gather sewing to that one unitary sheet of base trim cover assembly in a direction from one side thereof to another side thereof,
whereby at least one decorative crease is formed in the base trim cover assembly in such a fashion as to be developed symmetrically relative to the direction of the gather sewing in a same direction.

Accordingly, the resulting trim cover assembly presents such an appearance as if it was formed by sewing together three separate strips of trim cover assemblies and further represents an aesthetically improved different pattern of decorative crease in contrast to the prior art. This also contributes to saving the costs and number of required materials.

The gather sewing may be effected by means of a known gather sewing machine, and by operation of the gather sewing machine, a plurality of decorative creases may be formed such that each of them develops symmetrically relative to the sewing direction of the gather sewing machine, with the two symmetrical portions of the crease being oriented in a rearwardly slant direction in reference to that sewing direction.

Further, the one unitary sheet of base trim cover assembly may comprise a central seating cover section which covers said central seating section of the automotive seat.

In one aspect of the invention, the gather sewing may be effected to a frontal surface of such one unitary sheet of base trim cover assembly, and after the step of effecting the gather sewing, a part of the reverse side of the base trim cover assembly may be pinched outwardly, which corresponds to the decorative crease(s) so as to define at least one lug on the reverse side along the direction of gather sewing, and then the lug may be sewn in the longitudinal direction thereof. In this case, an anchoring member may be sewn integrally with such lug for the purpose of securing the resultant trim cove assembly to a cushion member forming a part of the seat.

In another aspect of the invention, a foam padding may be provided, which has at least one recessed groove formed therein, and the foregoing one unitary sheet of base trim cover assembly be placed upon the foam padding, after which, the same gather sewing be effected to both of the one unitary sheet of base trim cover assembly and foam padding along the recessed groove. In this respect, the one unitary sheet of base trim cover assembly may be greater in length than the foam padding, considering a number of gathers required for the gather sewing, with such arrangement that only the one unitary sheet of base trim cover assembly is subject to a gathering rocess of the gather sewing in the lengthwise direction thereof by a degree corresponding to that number of gathers, while sewing together, at the same time, both of those one unitary sheet of base trim cover assembly and foam padding.

In both of the foregoing two aspects of the invention, the decorative crease(s) may be deepened to represent a more aesthetically effective appearance of the trim cover assembly.

Moreover, the present invention aims at providing an automotive seat with the trim cover assembly formed above.

All another features and advantages will become apparent from reading of the descriptions hereinafter with reference to the drawings.

DETAILED DESCRIPTION OF PREFERRED EMBODIMENTS OF THE INVENTION

Firstly, through all embodiments shown in FIGS. 2 to 14, the present invention is embodied in the same central seating cover section (10) of trim cover assembly with that of the prior art, by way of one example, in order to facilitate the understanding of the inventive concept for forming the same four vertical rows of decorative creases (X1, X2, Y1, Y2) in contrast to those (X')(Y') of the previously described prior-art method. Hence, the gather sewing method in the present invention is not limited to all the embodiments that will be described hereinafter, but may be applied to another various cover sections of trim cover assembly for the automotive seat.

FIGS. 2 to 5 show a first embodiment of the present invention. In this particular embodiment, the basic novel gather sewing method is illustrated, which also applies to all other remaining embodiments shown in FIGS. 6 to 13. Particularly, reference being made to FIGS. 2 and 3, in accordance with the present invention, one unitary base sheet of trim cover assembly (1) (which will be referred to as "base cover sheet (1)" hereinafter) is utilized for forming the central seating cover section (10) (see FIG. 14), and such one base cover sheet (1) is of a length (L1 plus L2) greater by a length (L2) than that (i.e. L1) of a resulting size of central seating cover section (10) defined in both seat back (SB) and seat cushion (SC) of a resultant automotive seat shown in FIG. 14. That is, referring to FIG. 2, four vertical sewing lines $(l_1)(l_2)(l_3)(l_4)$ are firstly set lengthwise in the base cover sheet as indicated by the one-dot chain lines, along which a sewing is to be effected. During a practical gather sewing operation, four given vertical gather areas (1A)(1B)(1C)(1D) corresponding respectively to those four sewing lines $(l_1)(l_2)(l_3)(l_4)$ are gathered as indicated by the corresponding dotted lines in FIG. 2, which thus reduces the whole area of the base cover sheet (1) by (L2) into a predetermined area having the length (L1) matching to a predetermined area of central cover section (10) of resulting trim cover assembly. Therefore, the base cover sheet (1) should be prepared with such extended or margin area at (L2), taking a number of gathers into account.

Figure 4:
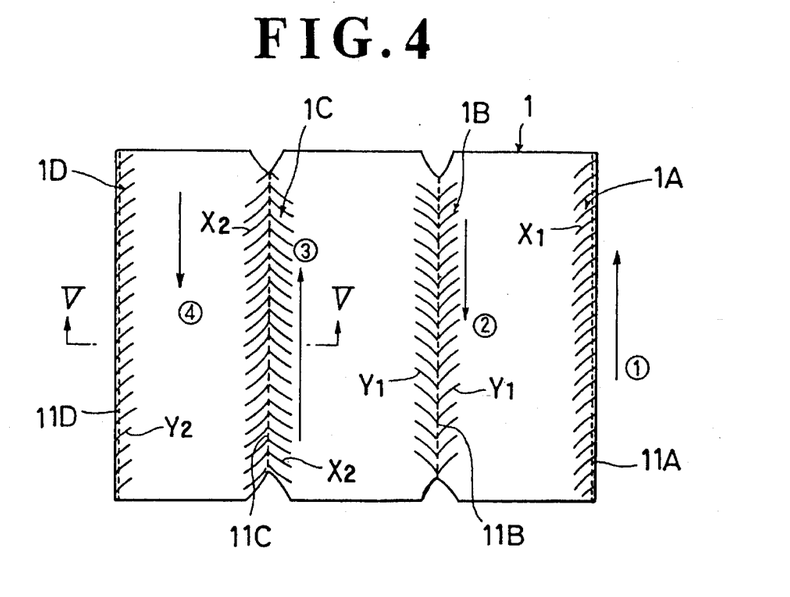
FIG. 4 is a plan view of a resulting trim cover assembly which has been gather sewn.
Figure 5:
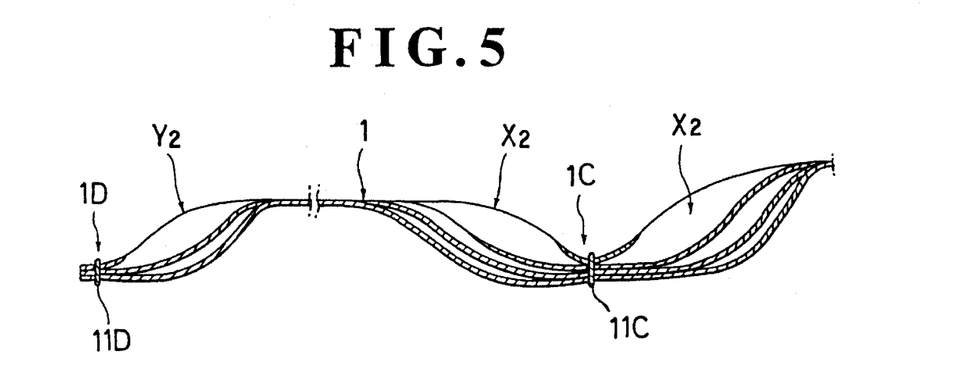
FIG. 5 is a sectional view taken along the line V—V in the FIG. 4.

Then, referring to FIGS. 3 and 4, by use of a known gather sewing machine (M), a first gather sewing should proceed in the direction ① in the first column of gather area (1A) along the first sewing line $(l_1)$ at the right-side lateral end portion of base cover sheet (1). At this stage, similarly to the formation of prior-art creases (Y') in FIG. 1, the gathered parts (1a, 1a, . . . ) are folded and sewn adjacent to and along the lateral end of the base cover sheet (1) by the retainer member (M1) and sewing needles (M2) of the gather sewing machine (M) (see FIG. 3), so that the resultant creases (X1) are each developed in a generally rearwardly slant fashion in reference to the sewing direction ① along the seam line (11A) as shown in FIG. 4.

After the first sewing step above, the second column of gather area (1B) in the same base cover sheet (1) is subject to the gather sewing in the sewing direction ② in FIG. 2 along the second sewing line $(l_2)$. It is seen here that, in contrast to the foregoing first sewing stage, the sewing machine (M) effects its sewing along a central line passing centrally of and through the gathered parts (1a, 1a, . . . ), leaving a straight seam line (11b) thereon, whereby each gathered part (1a) is drawn its central top point as it is folded and sewn in the sewing direction (S) (see FIG. 3) by the feeding and sewing operation of sewing machine (M), thus developing a crease symmetrically relative to the second sewing line ($l_2$) and, at the same time, extending both of its bifurcated right and left crease parts in a rearwardly slant fashion in reference to the sewing direction ②, so as to form a generally "V" shaped crease (Y1) as viewed from FIG. 4. In this way, a plurality of generally "V" shaped creases (Y1) are created along the second seam line (11B).

Next, likewise of the foregoing second V-shaped creases (Y1), the same gather sewing is effected along the third sewing line ($l_3$) in the sewing direction ③ which is now opposite to the second direction ②. Because of the reversal of sewing direction, a plurality of generally inverted-V-shaped creases (X2) are formed along the third seam line (11C) as viewed from FIG. 4.

Finally, the right-side lateral end portion of base cover sheet (1) is subject to the gather sewing along the sewing line ($l_4$). This sewing is similar to the previously described gather sewing at the left-side lateral end portion of base cover sheet (1), but the sewing should be done in the arrow direction ④ opposite to the initial sewing direction ①. Consequently, the resulting creases (Y2) are each developed in a rearwardly slant direction in reference to the sewing direction ④, which orients all the creases (2) in a direction opposite to the orientation of the first creases (X1). Designation (11D) denotes a fourth seam line.

Figure 14:
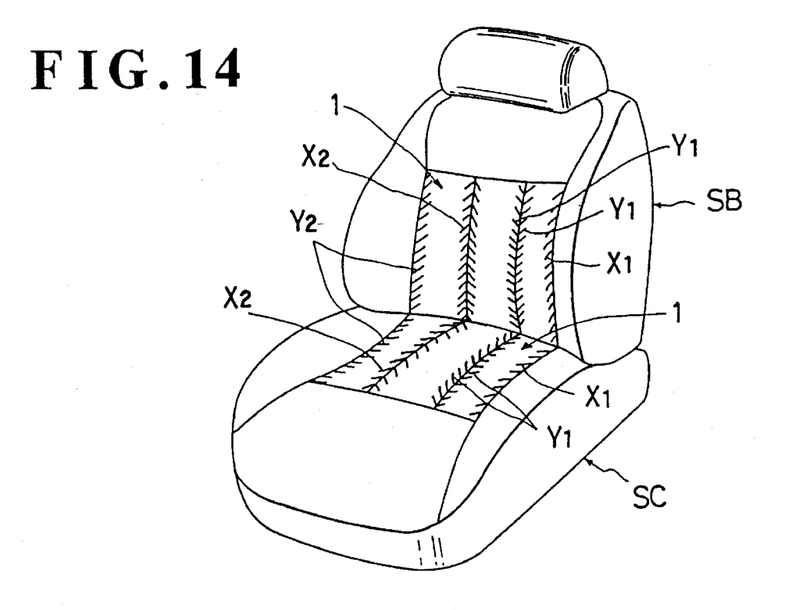
FIG. 14 is a schematic perspective of an automotive seat with the trim cover assembly formed in accordance with the present invention.

Accordingly, the thus-sewn base cover sheet (1) presents such an appearance as if it was formed by sewing together three separate strips of trim cover assemblies as similar to those prior-art ones (10A)(10B)(10C) (see FIG. 1), and further shows different orientations of decorative creases (X1)(Y1)(X2)(Y2). In the embodiment shown in FIG. 4, a set of creases (X1)(Y1), a set of creases (Y1)(X2) and a set of creases (X2)(Y2) are each oriented in the same direction. Such variation of decorative creases enhances an aesthetic appearance of automotive seat as they are applied to the central seating cover section thereof as shown in FIG. 14.

Figure 6:
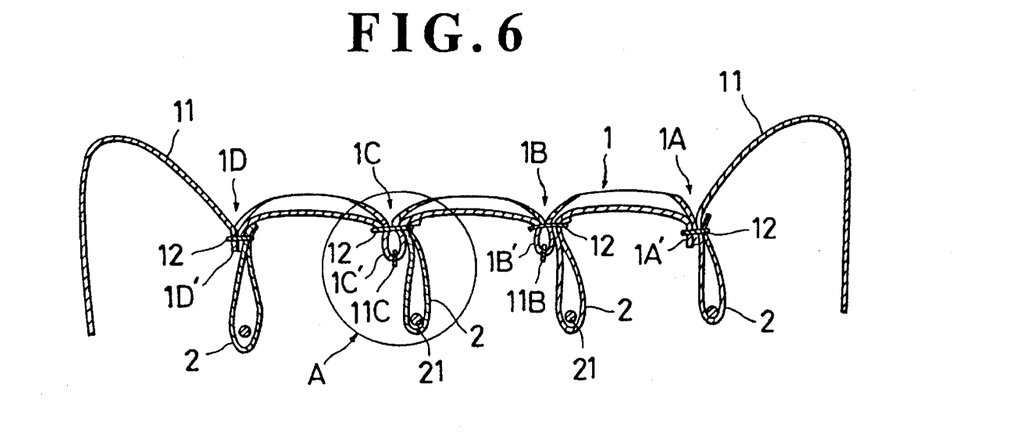
FIG. 6 is a sectional view of a second embodiment of trim cover assembly in accordance with the present invention.
Figure 7:
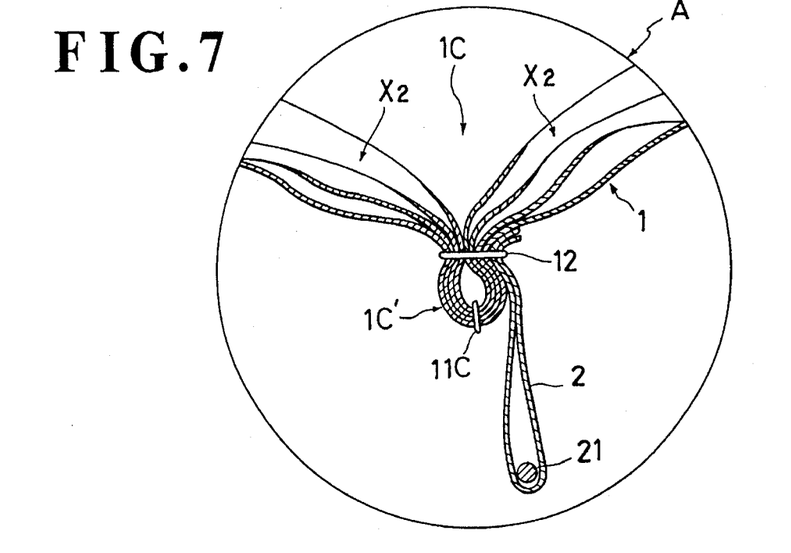
FIG. 7 is an partly enlarged view of a part "A" in the FIG. 6.
Figure 8:
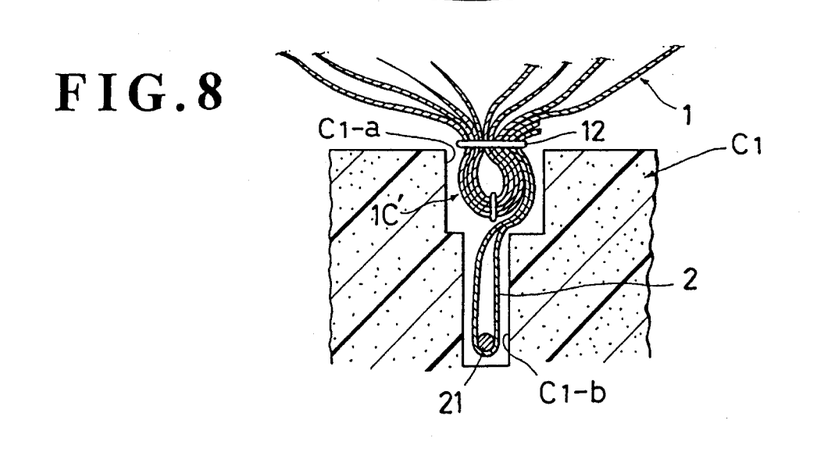
FIG. 8 is a sectional view showing the second embodiment of trim cover assembly secured in a cushion member.

FIGS. 6 to 8 show a second embodiment of the present invention, wherein a part of reverse side of the resultant trim cover assembly (1) obtained from the first embodiment above is pinched outwardly and sewn together at (12) in correspondence with each of the second and third column of gathered areas (1B)(1C) so as to form a small lug (1B', or 1C'), as can be seen from FIG. 6, such small lug projecting from the reverse side of trim cover assembly (1) and extending along the longitudinal direction of each seam line (11B or 11C). On the other hand, both lateral end portions of the trim cover assembly (1) are bent downwardly to form two lugs (1A')(1D') as in FIG. 6, the two lugs (1A')(1D') also projecting downwardly from the reverse side of trim cover assembly (1) and extending along the longitudinal direction of the corresponding seam lines (11A)(11D). Thus, four small lugs (1A', 1B', 1C' and 1D') are formed at the reverse side of trim cover assembly (1) which forms a central cover portion in the seat. Particularly, with regard to the two lugs (11B)(11C), an anchoring member (2) is fixed by sewing thereto at (12) as shown in FIG. 7. The anchoring member (2) has a securing wire (21) inserted therein at the lower end thereof. On the other hand, as shown in FIG. 6, other two lugs (1A')(1D') are each fixed by sewing at (12) with the same anchoring member (2) and further with one end portion of another separate strip of trim cover assembly (11) which corresponds to a lateral bolster portion of the seat. The thus-formed trim cover assembly are affixed over a foam cushion member (C1) forming a part of seat, as shown in FIG. 8. Namely, though not shown clearly but as understandable from FIG. 8, the cushion member (C1) is formed with four recessed grooves in correspondence with the foregoing four lugs (11A', 11B', 11C' and 11D'), and each of the recessed groves comprises an upper groove section (C1-a) and a lower groove section (C1-b). Therefore, in assemblage of seat, each of the four lugs (11A', 11B', 11C' and 11D') is inserted into the respective four grooves, such that the anchoring member (2) reaches the lower groove section (C1-b), while fitting the lug (11A', 11B' ...) in the upper groove section (C1-a), as shown exemplarily in FIG. 7. Although not shown, the securing wire (21) in the anchoring member (2) may be connected by a hog ring to an insert wire embedded in the cushion member (C1), to thereby anchor and fixedly secure the whole trim cover assembly (1 and 11) to the upper surfaces of cushion member (C1).

Figure 9:
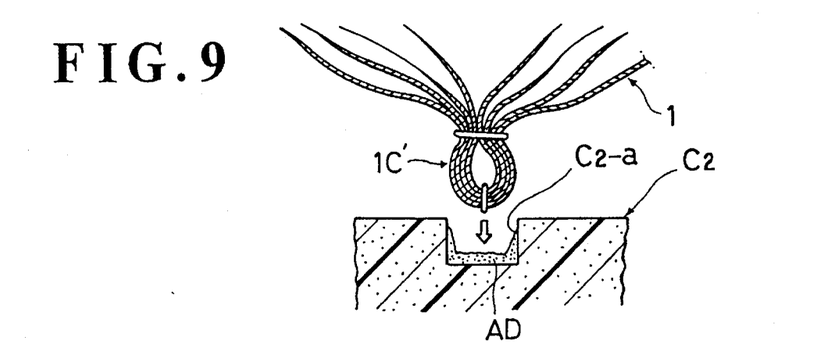
FIG. 9 is a sectional view showing a third embodiment of the invention which uses another example of trim cover assembly and cushion member.

FIG. 9 shows a third embodiment in association with the foregoing second embodiment, according to which, the four lugs (11A', 11B', 11C' and 11D') are not fixed with the anchoring members (2). As exemplarily shown in FIG. 9, through it only shows the fourth lug (11C'), there is provided another cushion member (C2) having four simple recessed grooves (C2-a) different from those (C1-b) of the cushion member (C1) of the second embodiment above, and each of the lugs (11A', 11B', 11C' and 11D') is bonded into the respective four recessed grooves (C2-a) by means of adhesive (AD). In that way, the whole trim cover assembly (1 and 11) (see FIG. 6) is fixedly secured to the upper surfaces of cushion member (C2).

It is appreciated from both second and third embodiments in FIGS. 6 through 9 that, by being so pinched and sewn at (12) to form such lug, each of decorative creases (X1, X2, Y1 and Y2) is so drawn forcibly downwards along the respective seam line (11A, 11B, 11C and 11D) as to represent a more deepened or pronounced degree of crease, which is effective in improving the appearance of seat in a better aesthetic way.

Figure 10:
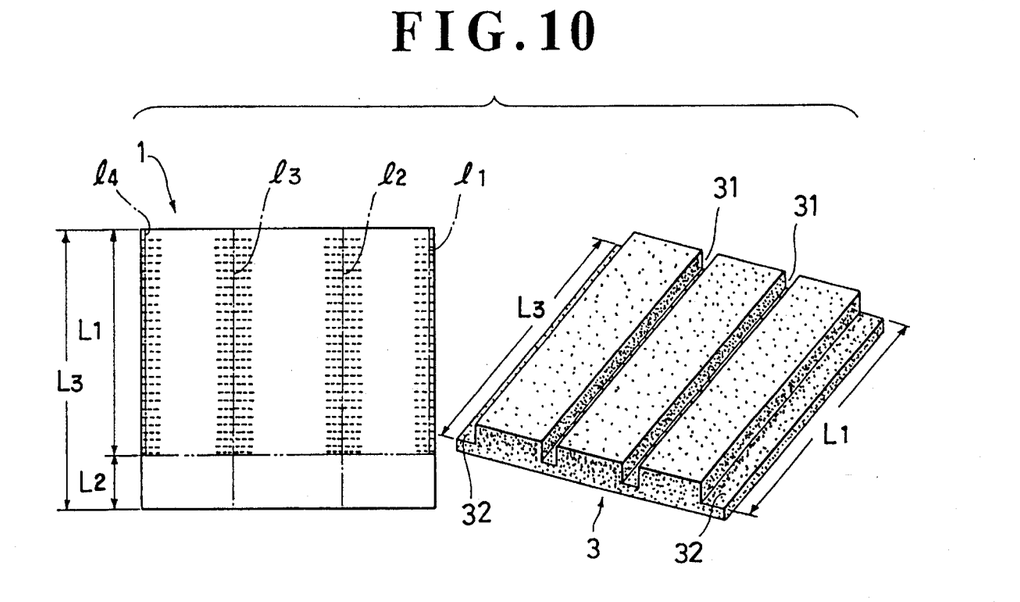
FIG. 10 is a schematic perspective view of a fourth embodiment of the present invention, which shows a base trim cover assembly and a foam padding.
Figure 11:
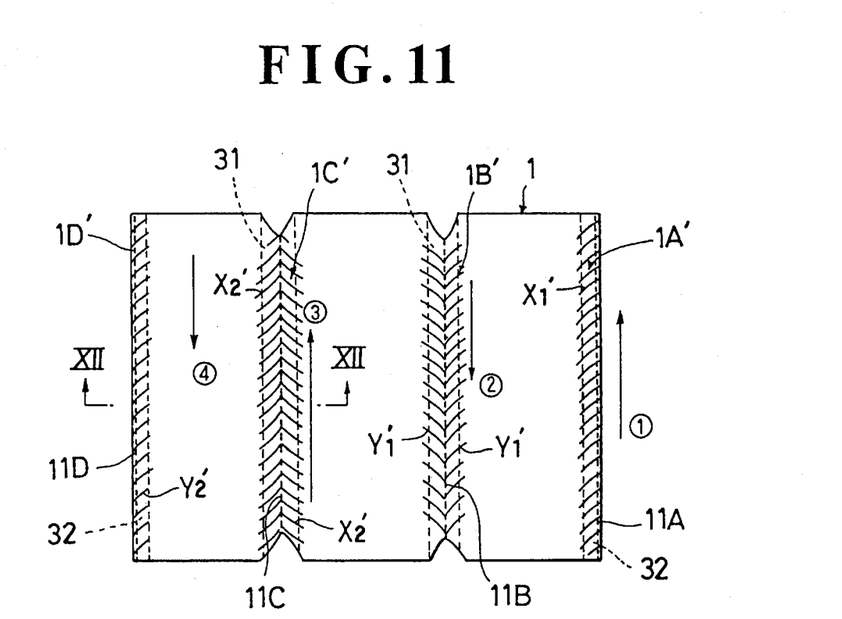
FIG. 11 is a plan view of a resulting trim cover assembly in the fourth embodiment.
Figure 12:
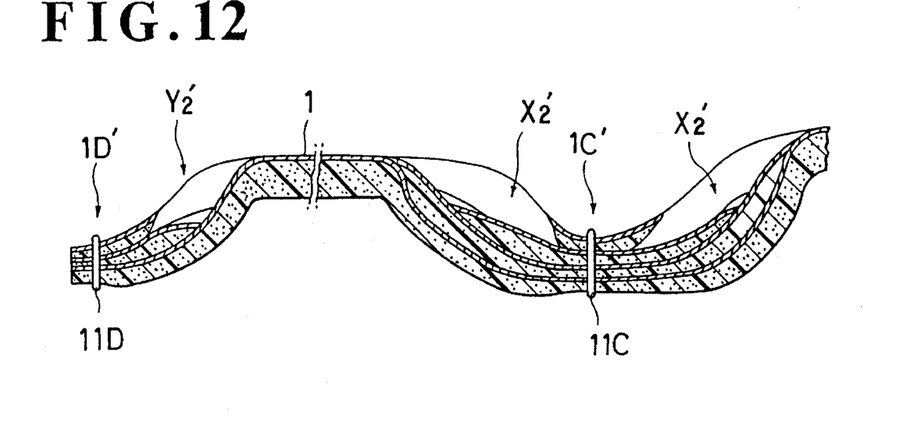
FIG. 12 is a sectional view taken along the line XII—XII in the FIG. 10.

FIG. 10 to 12 show a fourth embodiment of the present invention. In this embodiment, a foam padding (3) is provided, but the base cover sheet (1) described above is utilized in combination with the padding (3) for gather sewing purpose. Namely, the foam padding (3) is preformed from a thin urethane foam material (a slab urethane foam material) and may be shaped into one of the following two types for a purpose to be set forth later: a foam padding having a length (L1) and width equal to the corresponding length (L1) and width of the base cover sheet (1), except for the margin area at (L2) of the latter, and a foam padding having a length (L3) and width equal to the corresponding length (L3) and width of the base cover sheet (1). In both of those two cases, the configuration of the padding (3) is commonly shown in FIG. 10 such as to have, formed therein, a pair of rectilinear recessed grooves (31)(31) in correspondence with the second and third gather areas ($l_2$)($l_3$) of the base cover sheet (1), respectively, and a pair of lateral shoulder portions (32)(32) in correspondence with the first and third gather areas ($l_1$)($l_4$) of the same cover sheet (1), respectively.

In the practical sewing operation, an operator have choice of two kinds of gather sewings: (i) the gather sewing may be effected for both base cover sheet (1) and padding (3) or (ii) only the base cover sheet (1) may be subject to the gather sewing while sewing the same simultaneously to the padding (3). Of course, the known gather sewing machine is capable of both such two different ways of gather sewing.

In the former case (i) above, reference being made to FIGS. 10 to 12, the first preparation is to provide the above-noted type of base cover sheet (1) and padding (3), both of which have the same length (L3) and same width as can be seem from FIG. 10. Then, the base cover sheet (1) is placed upon the foam padding (3), such that the four sewing lines (l₁)(l₂)(l₃)(l₄) of the cover sheet (1) are aligned with those recessed grooves (31) and shoulder portions (32) of padding (3), respectively. Then, by use of the known gather sewing machine (M) (see FIG. 3), the same gather sewing operations as explained previously are effected to the thus-laminated unit of base cover sheet (1) and padding (3), as shown in FIG. 11, from the left side thereof down to the right side thereof, following the four sewing directions as indicated by the four arrow directions ①, ②, ③ and ④. In this embodiment, the first and last rounds of sewing are carried out along the respective first and fourth sewing lines (l₁)(l₄), each extending respectively adjacent and along both lateral ends of padding (3), whereas the second and third rounds of sewing are carried out along the respective second and third sewing lines (l₂)(l₃), each extending centrally and longitudinally of the respective two recessed grooves (31)(31) of padding (3). Hence, all of the resulting two simple creases (X'1)(Y'2) and two mutually oppositely oriented V-shaped creases (Y'1)(X'2) are drawn forcibly downwards at their corresponding vertical gather areas (1A')(1D')(1B')(1C'). As a result, as can be understood from FIGS. 11 and 12, those creases (X'1)(Y'1)(X'2)(Y'2) represent a more deepened or pronounced degree of crease, contributing thus to a highly aesthetic improvement of outer appearance of the seat.

In the latter case (ii) mentioned above, the first preparation is to provide another above-noted type of base cover sheet (1) having a length (L1) with its margin area extending therefrom in a length (L2) and foam padding (3) having a length (L1) and width equal to the corresponding length (L1) and width of the base cover sheet (1), except for the margin are at (L2). In this instance, by operation of the gather sewing machine (M), only the base cover sheet (1) is subject to the same gather sewing as explained above, while simultaneously sewing the same (1) to the padding (3), likewise of the former case (i) as indicated in FIG. 11, so that the whole length of cover seat (1) is reduced to the length (L1) for the same reason as in the first embodiment, which matches to the length (L1) of padding (3) and thus, the resulting gather-sewn trim cover assembly (1) is fixed on the whole area of padding (3), fitting precisely thereto in all length and width. In this case also, the creases are formed in such patterns as shown by (X'1)(Y'1)(X'2)(Y'2) in FIG. 11, with a more deepened or pronounced degree of crease than those of one sheet of trim cover assembly (1) in the first embodiment.

Figure 13:
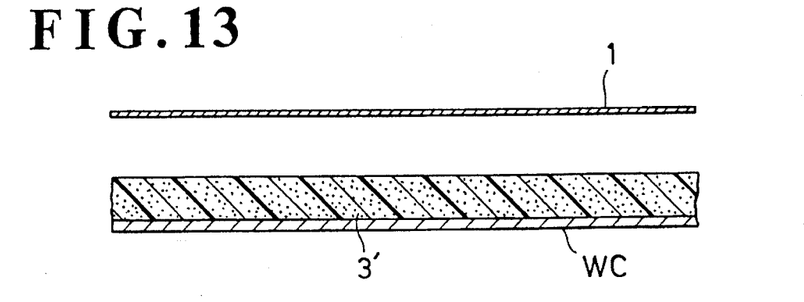
FIG. 13 is a sectional view of a fifth embodiment of the present invention, showing three-layer lamination structure of trim cover assembly.

FIG. 13 shows another example of lamination structure of trim cover assembly (1) in association with the above-described fourth embodiment, wherein there are employed a flat shape of padding (3'). and a back cover member (WC) bonded to the reverse side of such flat padding (3'). The same gather sewing as explained above, considering the fourth embodiment, may be effected to such three-layer lamination type of trim cover assembly in order to create the four similar decorative creases.

It should be understood that with regard to both two different trim cover assemblies in the fourth embodiment shown in FIGS. 10 to 12 and the last embodiment in FIG. 13, a part of the reverse side of them may be pinched outwardly and sewn to form a lug in the same way as described in the second embodiment shown in FIG. 6 and in the third embodiment shown in FIG. 9, and that further an anchoring member may be sewn together with such lug as shown in FIG. 9, so that the area of trim cover assembly corresponding to the crease may be fixedly secured to a cushion member (like (C1) or (C2) as in FIGS. 8 and 9.)

Precisely stated, it should be noted that, for all the embodiments above, the formation of the lug (1A', 1B', . . .) should be carried out by firstly pinching a part of the reverses side of trim cover assembly corresponding to the decorative creases, in a direction orthogonal to the direction wherein the gather sewing goes on in the base trim over assembly, i.e. in a direction orthogonal to the seam line (11B or 11C), and then continue to pinch the same part in the longitudinal direction thereof along the seam line, so that a proper length of the lug may be formed, extending on the reverse side of trim cover assembly along the seam line.

Any of the five embodiments having been described thus far may be worked to produce the same decorative creases in the central seating cover section (1) of trim cover assembly as applied to the automotive seat, as shown in FIG. 14, thereby attaining a far more aesthetically improved appearance of automotive seat.

But, the present invention is not specifically limited thereto, but may be modified in various ways insofar as it makes full use of the gather sewing to produce the decorative creases in a symmetrically developing fashion relative to the sewing line, with both two developed portions of creases oriented generally in the same direction in reference to the sewing direction, (or otherwise stated, developing each of the creases in relation to and on the opposite sides of the seam line along the sewing direction) or to produce the creases in such a fashion as to extend only from one side of the sewing direction. It should also be understood that other various modifications, replacements and additions may be applied to the present invention without departing from the scopes of appended claims. For example, the trim cover assembly (1) may be formed from a leather (including hides and skins) or a synthetic leather made of a synthetic resin material Additionally, in comparison with the prior art, the present invention is superior thereto in terms of low costs and small number of required materials, because the ordinary gather sewing is directly effected on one unitary sheet of base cover for the trim cover assembly.

What is claimed is:

1. A method for forming a decorative crease in a trim cover assembly for an automotive seat, comprising the steps of:

providing one unitary sheet of base trim cover assembly;

gathering and sewing said one unitary sheet of base trim cover assembly in a sewing direction from one side thereof to another side thereof, such that at least one row of plural gathered parts is created along the sewing direction, thus creating a seam which extends generally centrally of and through said plural gathered parts;

whereby each of the thus-sewn gathered parts produces a pair of decorative creases from and in relation to said seam, wherein said pair of decorative creases are formed in a symmetrical pattern relative to said direction of said gather sewing and also such that said decorative creases are formed in a rearwardly slanting direction in reference to said seam.

2. The method as defined in claim 1, wherein said automotive seat includes a central seating section and a peripheral bolster section surrounding said central seating section, and wherein said one unitary sheet of base trim cover assembly comprises a central seating cover section which covers said central seating section of said automotive seat.

3. The method as defined in claim 1, wherein, said automotive seat includes a central seating section and a peripheral bolster section surrounding said central seating section, wherein said one unitary sheet of base trim cover assembly comprises a central seating cover section which covers said central seating section of said automotive seat, wherein said gather sewing is effected to a frontal surface of said one unitary sheet of base trim cover assembly, wherein, after said step of effecting said gather sewing, there are further included the steps of forming an outwardly directed pinch in a part of a reverse side of said one unitary sheet of base trim cover assembly corresponding to said at least one decorative crease so as to define at least one longitudinally outwardly projecting lug on said reverse side which extends generally in a direction orthogonal with the laterally extending symmetrical decorative creases, and then sewing said at least one lug in the longitudinal direction thereof.

4. The method as defined in claim 3, wherein an anchoring member is sewn integrally with said lug along the longitudinal direction thereof.

5. The method as defined in claim 1, wherein said method further includes the steps of providing a foam padding having at least one recessed groove formed therein, placing said one unitary sheet of base trim cover assembly upon said foam padding, and then effecting said gather sewing to both of said one unitary sheet of base trim cover assembly and foam padding along said at least one recessed groove.

6. The method as defined in claim 5, wherein said foam padding is equal in length and width to said one unitary sheet of base trim cover assembly.

7. The method as defined in claim 5, wherein said one unitary sheet of base trim cover assembly is greater in length than said foam padding, to accommodate a plurality of gathers required for said gather sewing, and wherein said gather sewing is controlled such that only said one unitary sheet of base trim cover assembly is subject to a gathering process of said gather sewing in the lengthwise direction thereof by a degree corresponding to said number of gathers, while sewing together, at the same time, both of said one unitary sheet of base trim cover assembly and said foam padding.

8. The method as defined in claim 5, wherein the gather sewn portion of said one unitary sheet of trim cover assembly and foam padding comprises a central seating cover section which covers a central seating section of the automotive seat.

9. The method as defined in claim 5, wherein said gather sewing is effected to a frontal surface of the thus-laminated unit of said one unitary sheet of trim cove assembly and foam padding, wherein, after said step of effecting said gather sewing, there are further included the steps of forming an outwardly directed pinch in a part of a reverse side of both said one unitary sheet of base trim cover assembly and foam padding corresponding to said at least one decorative crease so as to define at least one lug on said reverse side along said direction of said gather sewing, and then sewing said at least one lug in the longitudinal direction thereof, and wherein the thus-formed resultant unit of said one unitary sheet of trim cover assembly and foam padding comprises a central seating cover section which covers a central seating section of the automotive seat.

10. The method as defined in claim 9, wherein an anchoring member is sewn integrally with said lug along the longitudinal direction thereof.

11. The method as defined in claim 5, wherein said method includes the additional step of providing a back cover member and fixing said back cover member to a reverse side of said foam padding, prior to said step of said gather sewing, so as to provide a three-layer lamination structure of base trim cover assembly, and thereafter effecting said gather sewing thereto.

12. The method as defined in claim 5, wherein a plurality of said recessed grooves are formed in said foam padding such that they are defined respectively in correspondence with one lateral end portion of said one unitary sheet of base trim cover assembly, another lateral end portion of the same, and a central area of the same between said one and another lateral end portions, and wherein said gather sewing is effected to both of said one unitary sheet of base trim cover assembly and foam padding, firstly at said one lateral end, then at said central area, and finally at said another lateral end portion.

13. An automotive seat with a trim cover assembly made by the method as defined in claim 5.

14. The method as defined in claim 1, wherein said gather sewing is effected to one lateral end portion of said one unitary sheet of base trim cover assembly, another lateral end portion of the same, and a central area of the same between said one and another lateral end portions, and wherein said gather sewing is conducted firstly at said one lateral end portion, secondly at said central area, and finally at said another lateral end portion.

15. The method as defined in claim 14, wherein said gather sewing is effected such that, at both said one and another lateral end portions of said one unitary sheet of base trim cover assembly, a sewing line, along which said gather sewing goes on, is set adjacent to and along a terminal end each of said one and another lateral end portions, to thereby form, in each of those two lateral portions, a decorative crease in such a fashion developing laterally on one side in reference to a direction of said gather sewing, whereas at said central area of said one unitary sheet of base trim cover assembly, said gather sewing is effected along at least one sewing line to thereby form, in said central area, at least one decorative crease in such a fashion developing symmetrically relative to a direction of said gather sewing in a same direction.

16. The method as defined in claim 1, wherein said gather sewing is effected to one lateral end portion of said one unitary sheet of base trim cover assembly, another lateral end portion of the same, and a central area of the same between said one and another lateral end portions, and wherein said gather sewing is conducted firstly at said one lateral end portion, secondly at said central area, and finally at said another lateral end portion.

17. The method as defined in claim 1, wherein said one unitary sheet of base trim cover assembly is formed from either of a leather and synthetic leather made of a synthetic resin material.

18. An automotive seat with a trim cover assembly made by the method as defined in claim 1.

19. The method as defined in claim 1, wherein, said gather sewing is effected by means of a gather sewing machine and wherein operation of said gather sewing machine forms said pair of decorative creases.

* * * * *